United States Patent [19]
Waters

[11] 3,739,556
[45] June 19, 1973

[54] WATER COOLING TOWERS

[75] Inventor: Charles E. Waters, Barrington, Ill.

[73] Assignee: Application Engineering Corporation, Elk Grove Village, Ill.

[22] Filed: Dec. 30, 1970

[21] Appl. No.: 102,776

[52] U.S. Cl. 55/257, 261/DIG. 11, 261/DIG. 112, 220/4 C, 220/73
[51] Int. Cl. B01f 3/04
[58] Field of Search........... 261/DIG. 11, DIG. 111, 261/DIG. 112; 55/257; 220/4 E, 4 C, 73

[56] References Cited
UNITED STATES PATENTS

| | | | |
|---|---|---|---|
| 2,843,291 | 7/1958 | Stopps | 220/73 |
| 3,132,190 | 5/1964 | Engalitcheff, Jr. | 261/30 |
| 3,263,853 | 8/1966 | Smith | 220/4 C |
| 3,286,999 | 11/1966 | Takeda | 261/DIG. 11 |
| 3,454,187 | 7/1969 | Rees | 220/73 |
| 3,481,114 | 12/1969 | Layfield et al. | 261/DIG. 11 |
| 3,497,058 | 2/1970 | Walker et al. | 220/4 E |
| 3,540,702 | 11/1970 | Uyama | 261/DIG. 11 |

Primary Examiner—Tim R. Miles
Attorney—James B. Kinzer, Thomas E. Dora and Lloyd L. Zickert

[57] ABSTRACT

An evaporative water cooling tower of the counterflow type, of all-plastic construction, in which the tower housing is formed of two symmetrical mating shells each vacuum-formed from a single sheet of high-impact ABS or other resin material, bonded together at flanged mating edges, having internal shelves formed integrally with the housing shells for supporting plastic evaporator and moisture eliminator grids in the housing, and including a water inlet comprising two intersecting PVC pipes, connected to a spray nozzle at the intersection, between the evaporator and eliminator grids.

9 Claims, 14 Drawing Figures

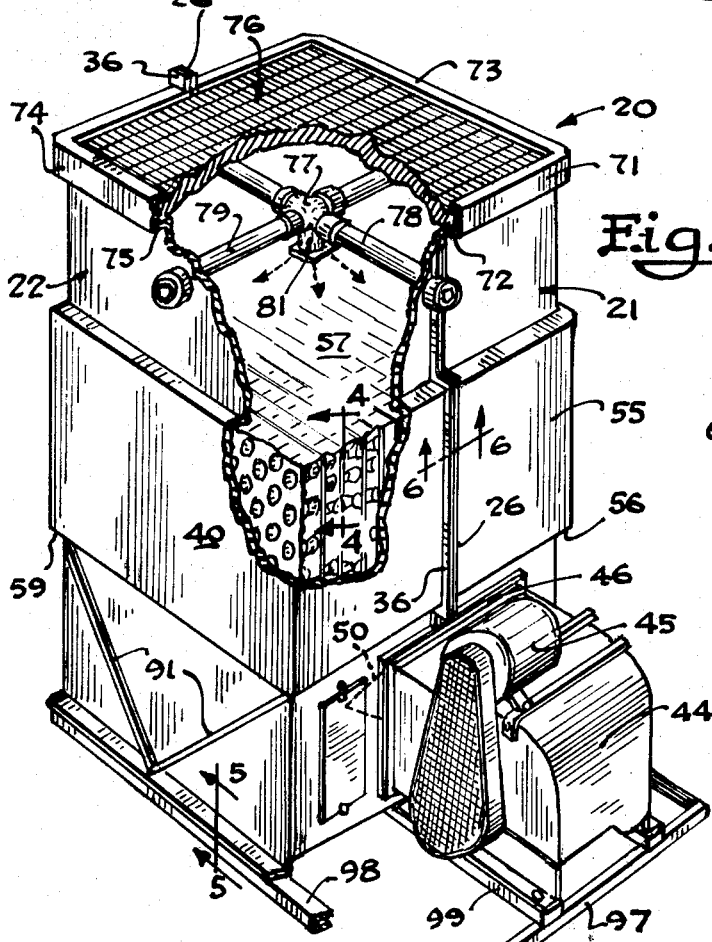

PATENTED JUN 19 1973 3,739,556
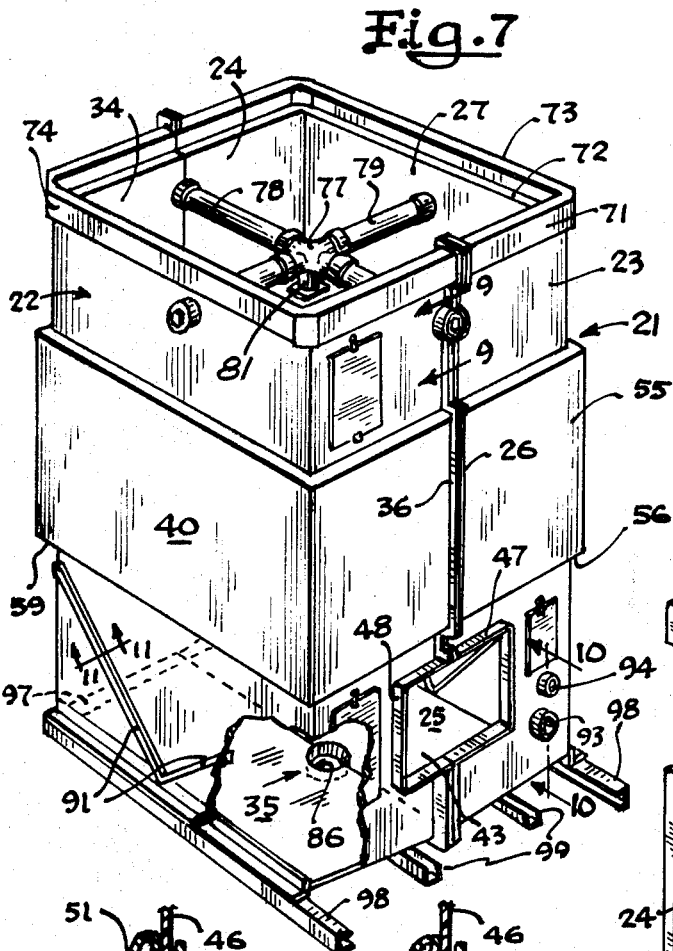
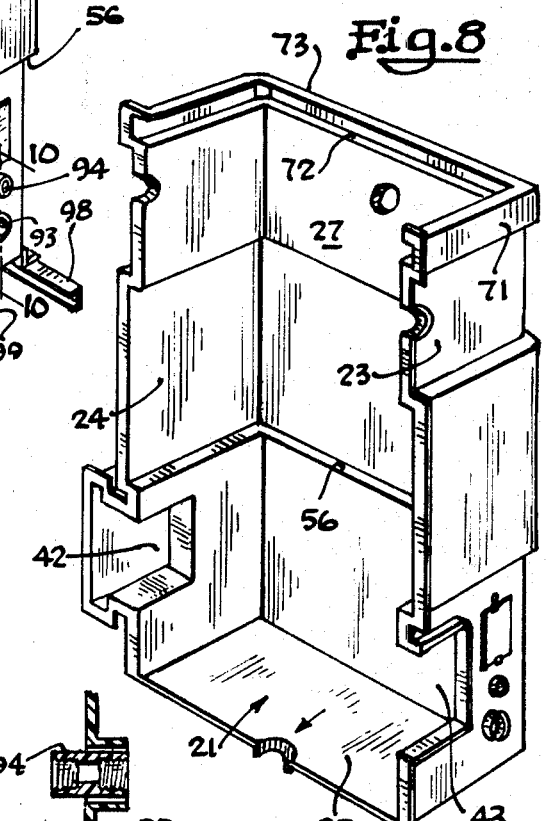
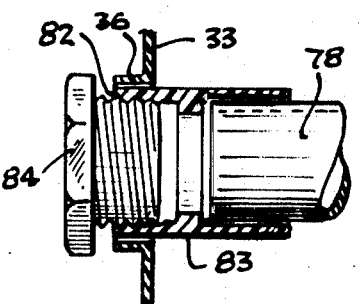
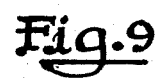
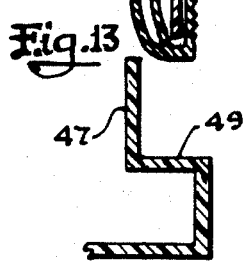
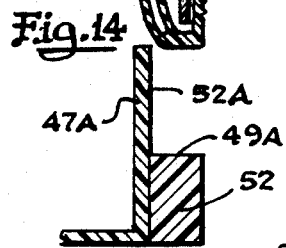
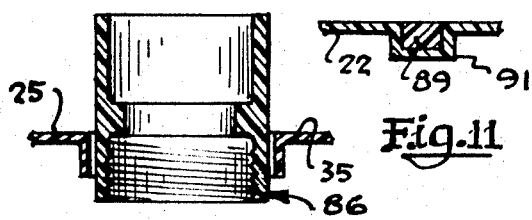
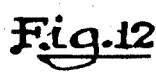
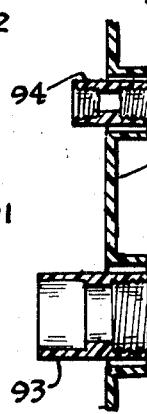
Inventor
Charles E. Waters
By Kinzer, Dorn and Zickert
Attorneys

WATER COOLING TOWERS

BACKGROUND OF THE INVENTION

There are many applications in which limited cooling of relatively large volumes of water is necessary on a continuing basis. For example, various industrial processes may require water cooled from about 95°F. to a temperature of about 85°F. in substantial volume. Similar requirements may be presented in relatively large air conditioning systems.

In many of these applications, cooling of the water is effected by partial evaporation in installations commonly referred to as cooling towers. In a conventional water cooling tower, the water is discharged onto an evaporator grid, sometimes called a wet deck, that affords a large surface area. Air is blown through the evaporator grid, in counterflow to the movement of water along the grid surfaces, evaporating a portion of the water and thereby cooling the remaining water, which is collected at the base of the tower and utilized for industrial processing, air conditioning, or other purposes. A relatively small cooling tower installation may have a capacity of about 40 tons; a large multi-tower installation may exceed 280 tons capacity, on the basis of 12,000 BTU per hour per ton with an actual heat rejection from the tower of 15,000 BTU per hour per ton required for refrigeration compressor applications.

Cooling towers constructed of conventional materials present some substantial problems. Because the cooling action of the tower depends upon evaporation, it is usually desirable to install the cooling tower outside of the building in which the cooled water is utilized, often necessitating a roof installation. Under these circumstances, the weight of the cooling tower, if built of sheet metal, plywood, or other conventional materials, may pose a substantial structural problem with respect to roof support. The tower must be rigid enough to withstand a substantial wind load, when installed out-of-doors. In the operation of the tower itself, the entire interior of the housing is continuously subject to contact with a flow of water that may be anything but pure, with a consequent high possibility and even probability of corrosion of conventional metal fittings or rotting of any exposed structural elements that are not completely impervious to water containing the usual minerals and other impurities. In virtually all applications, it is quite impractical to use distilled water or even de-ionized water, since a part of the water is continuously evaporated to the atmosphere and must be periodically replenished. Because of the requirement for protection against water damage, cooling towers have been rather relatively expensive in construction.

SUMMARY OF THE INVENTION

It is a principal object of the invention, therefore, to provide a new and improved water cooling tower construction that is light in weight, yet sufficiently strong for outdoor installation, and that is not subject to deterioration from continuous contact with water from an ordinary supply with a substantial mineral and other impurity content.

A particular object of the invention is to provide a new and improved cooling tower construction in which virtually the entire cooling tower, from housing through fittings, is constructed of plastic materials.

A specific object of the invention is to provide a new and improved non-corrosive light-weight cooling tower structure that is relatively low in cost and that can be erected quickly and inexpensively, yet which requires a minimum of maintenance in extended operation.

Accordingly, the invention relates to a water cooling tower comprising two four-sided mating housing shells, each formed from a continuous sheet of high-impact plastic materials, such as an ABS resin, and preferably of substantially identical configuration, sealed together along mating edges to form a fluid-tight cooling tower housing closed at the bottom and open at the top and having an air inlet opening in the lower part of one vertical wall, in predetermined spaced relation to the bottom of the housing, for connection to a blower for blowing a stream of air into the bottom portion of the housing. Each housing shell includes a first integrally formed internal shelf supporting a plastic wet deck evaporator grid that extends across the central portion of the housing; each housing shell further includes a second integrally formed internal shelf, supporting a plastic moisture eliminator grid that extends across and covers the top of the housing. At least one water inlet conduit extends across the upper part of the housing, between opposed vertical walls thereof, intermediate the eliminator grid and the evaporator grid. Nozzle means are connected to the water inlet conduit, for spraying water outwardly over the evaporator grid and downwardly through the cooling tower housing. A water outlet is located in the bottom portion of the housing, below the lower edge of the aforesaid air inlet opening.

BRIEF DESCRIPTION OF THE DRAWINGS

FIG. 1 is a perspective view, partially cut away, of a water cooling tower constructed in accordance with a preferred embodiment of the present invention;

FIG. 2 is a plan view of the water cooling tower of FIG. 1;

FIG. 3 is a detail view, partly in section, of a moisture eliminator grid incorporated in the water cooling tower of FIG. 1;

FIG. 4 is a section view of a portion of the evaporator grid of the cooling tower of FIG. 1, taken approximately along line 4—4 therein;

FIG. 5 is a detail sectional view of a part of the base of the water cooling tower of FIG. 1, taken approximately along line 5—5 therein;

FIG. 6 is a detail sectional view of the joint between the two shells that form the housing for the cooling tower of FIG. 1;

FIG. 7 is a perspective view of the cooling tower of FIG. 1 with the blower removed to show additional parts of the housing;

FIG. 8 is a perspective view of a housing shell forming one half of the cooling tower housing;

FIG. 9 is a detail section view illustrating the mounting of the water inlet conduits in the cooling tower, taken approximately along line 9—9 in FIG. 7;

FIG. 10 is a detail sectional view illustrating the mounting of a make-up water port and a float valve in the housing of the cooling tower, taken approximately along line 10—10 in FIG. 7;

FIG. 11 is a detail sectional view of a reinforcement in the cooling tower housing;

FIG. 12 is a detail sectional view of the water outlet of the cooling tower; and FIGS. 13 and 14 are detail sectional views of different configurations that may be employed for the air inlet opening of the cooling tower.

DESCRIPTION OF THE PREFERRED EMBODIMENT

The drawings, particularly FIGS. 1 and 7, illustrate a water cooling tower 20 constructed in accordance with a preferred embodiment of the present invention. Cooling tower 20 comprises two four-sided mating housing shells 21 and 22 each formed from a continuous sheet of high-impact plastic material; a single shell is illustrated separately in FIG. 8 to afford a better view of the rear of the shell. In the preferred construction, each of the housing shells 21 and 22 is preferably formed from a single sheet of high-impact acrylonitrile-butadiene-styrene (ABS) material having an opaque acrylic film laminated to its external surface for protection against ultra-violet radiation. The sheet has an initial thickness of no more that about 0.5 inch; a starting thickness of 0.3 inch is preferred.

The plastic sheet forming one of the housing shells 21 and 22 is initially pre-heated throughout its surface area and is suspended across the open end of a mold having a configuration conforming to the requirements for the shell. The interior of the mold is then evacuated, at a rapid rate, vacuum-drawing the plastic sheet into the mold and forming the housing shell to the required dimensions and configuration in a single operation. Formation of a housing shell is thus effected in one step, although some subsequent trimming and cutting of the shell may be required. Because of the size of the housing shell (a typical cooling tower may be approximately 4 feet wide by 4 feet deep by 8 feet high) extremely large vacuum molding equipment is necessary; the housing shells for cooling tower 20 may be molded in the equipment used commercially for the manufacture of boat hulls.

In molding of housing shells 21 and 22, although a high-impact ABS resin is preferred, other strong impact-resistant plastics suitable for molding in large sheets can be employed. The plastic must afford substantial resistance to deterioration in the presence of a continuous wash of the housing interior with ordinary tap water and its attendant impurities. For added strength, suitable fillers may be used in the plastic material from which the sheets used to form the housing shells 21 and 22 are fabricated. Indeed, the housing shells 21 and 22 can be formed from resin-impregnated fiberglass, if desired, although this construction is usually more expensive than warranted for cooling tower use.

Along one edge of each of the front and rear walls 23 and 24 and the bottom wall 25, of shell 21, as shown in FIG. 8, there is a relatively wide integral right-angle flange 26. There is no need for a corresponding flange on the side wall 27. Similarly, the front and rear walls 33 and 34 and the bottom wall 35 of shell 22 are each formed with a relatively wide integral flange 36 that extends continuously along the wall edges.

In the assembly of cooling tower 20, the two housing shells 22 and 23 are joined together with their respective flanges 26 and 36 abutting each other as shown in FIGS. 1, 6 and 7. As can be seen in the detail view of FIG. 6, the two flanges 26 and 36 mate with a substantial surface area contact between the two flanges. The resulting joint between the housing shells 21 and 22 is sealed by means of an epoxy resin or other appropriate solvent-type adhesive that is compatible with the plastic materials used in the molding of the shells 21 and 22. In the preferred construction illustrated in FIG. 6, the epoxy resin bond 37 between housing shells 21 and 22 is reinforced by a plurality of staples or other mechanical fastening means 38. When thus joined together, and as shown in FIGS. 1 and 7, the two shells 21 and 22 afford a fluid-tight cooling tower housing that is closed along the bottom formed by the shell walls 25 and 35 but is open at the top.

When the housing shells 21 and 22 are formed, each shell is provided with an exteriorly projecting section of relatively small depth in each of the front and rear walls, as illustrated by the projections 41 and 42 on the front and rear walls 23 and 24, respectively, of shell 21 (FIG. 8). When the two shells are joined together, as described above, the rear projection 42 is unmodified and the flanged edge of that projection is sealed directly to a corresponding projection on housing shell 22 to afford a continuous unbroken back wall for the cooling tower housing. The projection serves no particular function on this part of the cooling tower housing, but permits use of two housing shells made from the same mold.

Before the shells are joined, however, the front of the projection 41 in the front wall 23 of shell 21 is cut away. The similar portion of the mating shell 22 is also cut away, affording a flanged air inlet opening 43 in the front wall of the assembled cooling tower housing. The opening 43 is located a short distance above the bottom of the cooling tower housing (about 10 inches in a typical 8-foot tower) and affords an effective and convenient means for connecting an air blower 44 to the cooling tower (FIG. 1).

Blower 44 may be of conventional construction and preferably comprises a centrifugal blower powered by appropriate means such as an electric motor 45. The outlet end of blower 44 comprises a duct 46 having an external configuration that conforms closely to the internal configuration of the flanges 47 and 48 around the air inlet opening 43 (FIG. 7). The construction should be such as to afford an effective and convenient means for sealing the air inlet opening of cooling tower 20 to prevent the escape of water from the tower around the rim of the air inlet opening.

One construction that may be adopted for the flange construction between the cooling tower housing and the blower duct 46 is shown in FIG. 13. As illustrated therein, flange 47 is of re-entrant construction and includes a transverse wall 49 positioned for abutting engagement with a gasket 51 mounted upon the outer rim of blower duct 46. In addition, flange 47 has a lateral wall 52 that is substantially parallel to duct wall 46, and a part of gasket 51 is interposed between the duct wall 46 and the flange surface 52. This construction affords sealing in two directions and gives substantial assurance of a watertight joint.

Another construction that may be employed for the air inlet opening is illustrated in FIG. 14. As shown therein, the housing flange 47A around the air inlet opening may be of simple angular configuration, in cross-section. A rigid plastic reinforcement 52 is bonded to the inner surface of flange 47A at some distance from the outer lip of the flange. Again, as in the previous construction, there is both a transverse abutment surface 49A and a lateral sealing surface 52A, both of which are engaged by a gasket 51 on the blower duct 46. Other gasket configurations can be adopted; the combination of two surfaces for sealing engagement is much preferred because the air inlet opening otherwise represents a substantial danger of leakage from the cooling tower. The upper edge of blower duct 46 may be provided with a deflector vane 50 to direct the air entering tower 20 downwardly as it enters the tower. This avoids a direct blast across the tower onto the rear wall, which could produce undue vibration of the rear wall.

Housing shell 21, as molded, includes an outwardly projecting central portion 55 that begins immediately above the air inlet opening 43 and that extends around the complete periphery of the housing shell. As shown in FIGS. 1 and 8, the lower edge 56 of the outwardly projecting central portion 55 in housing shell 21 affords an integral internal shelf for supporting a plastic wet deck evaporator grid 57. The central portion of housing shell 22 is of corresponding configuration, having an outwardly projecting central portion 58 that forms an internal integral shelf 59 for supporting the wet deck evaporator grid 57.

As shown in FIGS. 1 and 4, the wet deck evaporator grid 57 is formed of a multiplicity of thin plastic sheets, such as the sheets 61, 62 and 63 (FIG. 4). Sheet 61 is molded, by vacuum molding or other suitable techniques, to afford a multiplicity of individual projections 64 facing outwardly of one side of the sheet, with similar projections 65 on the opposite side. The projections 65 on sheet 61 mate with and are bonded to a corresponding multiplicity of projections 66 on the next adjacent evaporator grid sheet 62. The back surface of sheet 62 has a multiplicity of individual projections 67 that mate with corresponding projections 68 on the next grid sheet 63. This construction is continued across the full width of cooling tower 20 to afford a complete wet deck evaporator grid that fills the entire central portion of the cooling tower housing.

The plastic sheets that form the evaporator grid 57 may be quite thin and are preferably fabricated from a relatively strong and highly water-resistant plastic material. The number of projections 65–68 on the individual grid sheets and the spacing of those projections is not particularly critical; however, the evaporator grid 57 should afford a large surface area to aid evaporation in operation of the cooling tower.

The upper rim of housing shell 21 is formed with an encompassing outwardly projecting portion 71 having a lower edge portion 72 and an upper re-entrant flange portion 73, as best shown in FIGS. 1, 2, 7 and 8. The outwardly projecting top portion 71 of housing shell 21 is matched by a similar outwardly projecting top portion 74 on the other housing shell 22. The lower edges 72 and 75 of the projections 71 and 74 afford a continuous internal shelf that is an integral part of the cooling tower housing and that provides a support for a plastic moisture eliminator grid 76 that extends across and covers the entire top of the cooling tower housing.

One construction that may be used for the eliminator grid 76 is illustrated in FIGS. 2 and 3. As shown therein, the eliminator grid is formed of a multiplicity of segments of thin plastic material shaped to provide a very large number of sinuous passageways 80 leading from the interior of the cooling tower to the outside air. Grid 76 is preferably formed from a relatively strong resin material; the particular resin employed is not critical. Grid 76, in most installations, is exposed to direct sunlight and, accordingly, is preferably coated with an appropriate material to prevent deterioration of the plastic as the result of ultraviolet radiation.

In the upper portion of the housing of cooling tower 20 there are two water inlet conduits that extend across the housing immediately below eliminator grid 76 and that join in a cross fitting 77. One of these conduits 78 extends from the front wall of the housing to the rear wall; the other conduit 79 extends across the housing between the side walls 27 and 37. The pipe sections forming the water inlet conduits 78 and 79 are formed of plastic; three inch polyvinyl chloride pipe is preferred. The same material is preferably utilized for the cross fitting 77. A unitary ceramic nozzle 81 is mounted upon the cross fitting 77 in position to spray water outwardly over the entire area of the evaporator grid 57.

A preferred mounting for the water inlet conduits is shown in detail in FIG. 9. As illustrated therein, a small flanged opening 82 is formed in the wall of the tower housing. A molded plastic adaptor 83 is bonded in place in opening 82, and is sealed to the flange around the opening to afford a water-tight joint. The inlet conduit, such as conduit 78, is fitted into adaptor 83 and is bonded in place in the adaptor. The outer portion of adaptor 83 comprises a threaded opening; the threaded openings in three of the adaptors are sealed by suitable means such as the molded PVC plug 84 shown in FIG. 9. One of the four inlet openings to the water inlet conduits is connected to the return water line of the process equipment or air conditioning equipment with which the cooling tower is used by a suitable pipe (not shown).

The nozzle 81 may be of conventional construction. In the preferred form, as illustrated in the drawings, a single ceramic nozzle is utilized, one which provides a wide spray pattern to spray water over the entire upper surface of the wet deck grid 57. Multiple nozzle trees or other constructions can be employed if preferred.

The cooled water is withdrawn from cooling tower 20 through a water outlet opening located at the center of the bottom wall of the cooling tower. As shown in FIG. 12, the water outlet connection may be afforded by an adaptor plug 86 which may be of the same construction as the adaptors employed for the water inlet connections. The complete adaptor may be utilized if desired, or the upper portion, above the bottom walls 25 and 35 of the cooling tower, may be cut off. If the complete adaptor plug is employed, the upwardly extending portion of the adaptor serves as a dirt leg for the water outlet. If desired, the water and the outlet opening may be formed in one of the side walls of the cooling tower housing so long as it is located substantially below the lower edge of the air inlet opening 43 (FIG. 7). However, the bottom walls of the two housing shells 21 and 22 are preferably inclined downwardly and inwardly at a slight angle, as is apparent from FIG. 7, and the central location for the water outlet in the bottom of the inclined pan formed by the two housing shells is preferred. A separate drain opening (not shown) may also be installed in one of the bottom wall sections 25 and 35 for cleaning purposes.

One of the points of maximum stress in the housing of cooling tower 20 is along the intersection formed by the bottom and side walls of each shell, such as walls 35 and 40. This is particularly true when the tower is supported by a frame having principal support members that extend from front to back of the tower, as described more fully hereinafter. To reinforce this portion of each shell, an elongated rigid reinforcing member is bonded into the corner formed by the bottom and side walls.

Thus, as shown in detail in FIGS. 5 and 7, a reinforcing member 88 is bonded into the corner at the juncture of walls 40 and 35 of shell 22. Reinforcing member 88 is preferably an angle member and may be formed of aluminum or other corrosion-resistant metal. Preferably, however, member 88 constitutes an elongated angle member molded or otherwise formed from resin-impregnated glass fiber; a polyester resin is preferred. The sheet material forming housing walls 40 and 35 is bonded around and encompasses all of the external surfaces of reinforcing member 88, leaving only one surface exposed with that surface located on the interior of the cooling tower housing. It is highly desirable that the sheet material extending around the reinforcing member 88 not be unduly weakened, so that the corner of the cooling tower housing remains completely sealed. The exposed internal surface of reinforcing member 88 may subsequently be covered or painted if desired, but this is not usually necessary, particularly if a water-resistant plastic material is used to form the reinforcement. A similar reinforced construction is used along the bottom edge of the side wall for housing shell 21.

The lower portions of housing shells 21 and 22, below wet deck 57, are subjected to greater stress than the upper portions of the cooling tower housing, particularly because a substantial quantity of water may collect in the bottom of the cooling tower. Accordingly, it may be desirable to reinforce these portions of the housing walls by bonding rigid reinforcement members such as the rib members 89 into molded depressions 91 in the walls as shown in FIGS. 1 and 7 and as illustrated in detail in FIG. 11. The reinforcing ribs 89 may be maintained in position by suitable resin bonds or other adhesive bonds; sonic welding can also be employed. Additional reinforcements may be used as required, particularly around air inlet 43.

It is necessary to provide a means for replacing evaporated water in the industrial processing or air conditioning system in which cooling tower 20 is incorporated. An appropriate make-up water inlet comprising an adaptor 94 is mounted in the front wall of the housing, in shell 21, a short distance above the lower edge of the air inlet opening 43. A water supply line can be readily connected to adaptor 94 to afford a means for maintaining a substantially constant water supply in the system. In those installations in which the base of cooling tower 20 is to provide a reservoir for the system, a float valve is installed in the cooling tower. Adaptor 94 may also be used to provide a support and access means for the float valve arm. The float valve may be of conventional construction and, accordingly, has not been illustrated in the drawings. An overflow outlet, comprising an adaptor 93 sealed in wall 23 just below the lower edge of opening 43, is also provided. Both of the inlet water and overflow adaptors 94 and 93 are sealed into small openings in the housing wall and both are preferably formed of polyvinyl chloride or other plastic compatible with the material used for the cooling tower housing.

Cooling tower 20 is supported upon a simple rectangular frame 96 having front and back frame members 97, two external side members 98, and two intermediate support members 99 that extend in parallel spaced relation to side members 98. On a frame such as frame 96, cooling tower 20 is completely self-supporting and can be mounted on a roof or other outside location. Blower 44 is mounted upon the two inner frame members 99 to assure relatively accurate alignment with the central air intake opening 43 in the cooling tower. Preferably, a plurality of clamps are utilized to hold the reinforced flanges at the bottom of the cooling tower housing on the outside frame members 98 so that there is no necessity for drilling through the flanges of the cooling tower housing and hence no substantial possibility of creating a leak at this point.

In the fabrication of cooling tower 20, the initial step is the molding of the two symmetrical housing shells 21 and 22. The front portion of the molded projection 41 in the front wall 23 of shell 21 is cut away and the corresponding portion of the mating shell 22 is also cut away to form the two halves of the air inlet opening 43; this operation can be performed after assembly of the housing shells if desired. The wet deck evaporator grid 57 and the moisture eliminator grid 76 are assembled. Either or both grids may be assembled complete or may be in two half sections. The PVC pipes forming the water inlet conduits 78 and 79 are also assembled to the cross fitting 77. All of these elements of the cooling tower are then brought together, with the grids and the inlet conduits positioned within the two housing shells.

A bonding adhesive is applied to the flanged surfaces of the two housing shells and the peripheral flanges of the shells are clamped together to seal the two shells into a complete housing. Removable clamps may be utilized, and the adhesive bond alone may be relied upon to maintain the cooling tower housing shells in sealed relation to each other. On the other hand, as described above in connection with FIG. 6, mechanical fasteners such as staples may be utilized to supplement the adhesive bond and to obtain additional mechanical strength in the long peripheral joint between housing shells 21 and 22.

The operation of cooling tower 20 is substantially conventional. One of the inlets to the conduits 78 and 79 is connected to a return water line from the industrial processing equipment or air conditioning apparatus with which the cooling tower is used. The water outlet 86 is connected to a suitable pump for pumping water from the tower to the equipment in which the cooled water is used. The blower 44 is connected to air inlet opening 43 and the make-up water inlet 94 is connected to a suitable supply of make-up water.

The main stream of water enters tower 20 near the top, through one of the conduits 78 and 79, and is discharged in a spray from nozzle 81, across the upper surface of the wet deck evaporator grid 57. As the water cascades down through the wet deck grid, it is contacted by a relatively high volume of air moving upwardly through the tower, the air being supplied by blower 44. The counterflow of air evaporates a part of the water so that the water collecting in the bottom of the tower is at a substantially lower temperature than the water entering the tower. The cooled water is withdrawn through outlet 86 for use by the equipment with which the tower is employed. Water losses can be made up in some other part of the system or may be replenished through a make-up water connection to adapter 94, under the control of a float valve, as described above.

Some limited maintenance may be necessary in connection with operation of cooling tower 20. Thus, nozzle 81 may become clogged and require replacement. It may be necessary to clean out any accumulation of material, brought in with the water, from the pan afforded by the bottom walls 25 and 35 of the tower. It may also be necessary to service a float valve if employed in connection with the tower. For these limited maintenance needs, appropriate access doors may be cut into housing shells 21 and 22 and provided with suitable removable covers, as shown in FIGS. 1 and 7.

Cooling tower 20 is quite inexpensive in construction and is much lighter in weight than towers of similar capacity employing conventional constructions. For example, a tower of forty ton capacity built in accordance with the present invention has an operating weight of approximately 1,200 pounds, as compared with a cooling tower of similar capacity but of conventional construction, for which the weight is approximately 2,000 pounds. Cooling towers constructed in accordance with the invention can be assembled back-to-back or side-by-side to complete cooling tower installations of increased capacity; two of the towers located immediately adjacent each other can be directly connected for inlet water connections with no additional spacing required between the tower units. The all-plastic construction of the cooling tower assures long life, yet affords adequate strength for outdoor installations.

I claim:

1. A water cooling tower comprising:
   two four-sided mating housing shells, each formed from a continuous sheet of high-impact plastic material, sealed together along mating edges to form a fluid-tight cooling tower housing closed at the bottom and open at the top and having an air inlet opening in the lower part of one vertical wall, in predetermined spaced relation to the bottom of the housing, for connection to an air blower for blowing a stream of air into the bottom portion of said housing;
   said housing shells being symmetrical in configuration and having their mating edges formed as externally projecting flanges with engaging surfaces disposed in a common vertical plane;
   said air inlet opening being centered on the joint between said housing shells and being encompassed by an externally projecting integral flange affording a continuous lateral sealing surface for parallel engagement by a gasket on the outlet duct of an air blower;
   each of said housing shells including a first integrally formed internal shelf supporting a plastic wet deck evaporator grid that extends across the central portion of said housing;
   each of said housing shells further including a second integrally formed internal shelf, supporting a plastic moisture eliminator grid that extends across and covers the top of said housing;
   at least one water inlet conduit extending across the upper part of said housing, between opposed vertical walls thereof, below said eliminator grid and above said evaporator grid;
   nozzle means connected to said water inlet conduit, for spraying water outwardly over said evaporator grid and downwardly through said cooling tower housing;
   and a water outlet located in the bottom portion of said housing, below the lower edge of said air inlet opening.

2. A water cooling tower according to claim 1 in which each housing shell is vacuum-formed from a single sheet of high-impact ABS resin having an initial thickness of no more than about 0.5 inches.

3. A water cooling tower according to claim 1 in which the flanges on said housing shells are joined by mechanical fastening means and are also sealed together by a solvent-type adhesive compatible with the plastic material of said shells.

4. A water cooling tower according to claim 1, in which said flange further affords a transverse sealing surface for abutting engagement with said outlet duct gasket.

5. A water cooling tower comprising:
   two four-sided mating housing shells, each formed from a continuous sheet of high-impact plastic material, sealed together along mating edges to form a fluid-tight cooling tower housing closed at the bottom and open at the top and having an air inlet opening in the lower part of one vertical wall, in predetermined spaced relation to the bottom of the housing, for connection to an air blower for blowing a stream of air into the bottom portion of said housing;
   each housing shell further comprising an elongated rigid reinforcing member bonded into the corner formed by the bottom wall of the shell and the side wall thereof opposite the other housing shell, with an unbroken portion of the plastic material of the housing shell extending completely around all but one internal surface of said reinforcing member;
   each of said housing shells including a first integrally formed internal shelf supporting a plastic wet deck evaporator grid that extends across the central portion of said housing;
   each of said housing shells further including a second integrally formed internal shelf, supporting a plastic moisture eliminator grid that extends across and covers the top of said housing;
   at least one water inlet conduit extending across the upper part of said housing, between opposed vertical walls thereof, below said eliminator grid and above said evaporator grid;
   nozzle means connected to said water inlet conduit, for spraying water outwardly over said evaporator grid and downwardly through said cooling tower housing;
   and a water outlet located in the bottom portion of said housing, below the lower edge of said air inlet opening.

6. A water cooling tower according to claim 5, in which said reinforcing member comprises an elongated angle member molded of resin-impregnated fiberglass.

7. A water cooling tower comprising:
   two four-sided mating housing shells, each formed from a continuous sheet of high-impact plastic material, sealed together along mating edges to form a fluid-tight cooling tower housing closed at the bottom and open at the top and having an air inlet opening in the lower part of one vertical wall, in predetermined spaced relation to the bottom of the housing, for connection to an air blower for blowing a stream of air into the bottom portion of said housing;

each of said housing shells including a first integrally formed internal shelf supporting a plastic wet deck evaporator grid that extends across the central portion of said housing;

each of said housing shells further including a second integrally formed internal shelf, supporting a plastic moisture eliminator grid that extends across and covers the top of said housing;

two water inlet conduits extending across the upper part of said housing, between opposed vertical walls thereof, below said eliminator grid and above said evaporator grid, said water inlet conduits being disposed at right angles to each other and intersecting at a cross fitting, said conduits and said fitting all comprising molded plastic members;

nozzle means, connected to said cross fitting joining said water inlet conduits, for spraying water outwardly over said evaporator grid and downwardly through said cooling tower housing;

and a water outlet located in the bottom portion of said housing, below the lower edge of said air inlet opening.

8. A water cooling tower according to claim 7, in which said conduits and said fitting are all formed of polyvinyl chloride.

9. A water cooling tower according to claim 7, in which said nozzle means comprises a single ceramic spray nozzle having a wide horizontal spray pattern.

* * * * *